(12) United States Patent
Grubert et al.

(10) Patent No.: US 8,524,182 B2
(45) Date of Patent: Sep. 3, 2013

(54) CATALYZED SOOT FILTER WITH LAYERED DESIGN

(75) Inventors: Gerd Grubert, Hannover (DE); Alfred Punke, Walle (DE); Torsten Neubauer, Langenhagen (DE); Ruediger Wolff, Nienburg (DE); Stanley Roth, Yardley, PA (US); Yuejin Li, Edison, NJ (US); Torsten Müller-Stach, Hannover (DE); Marcus Hilgendorff, Hannover (DE)

(73) Assignees: BASF SE, Ludwigshafen (DE); BASF Corporation, Florham Park, NJ (US)

( * ) Notice: Subject to any disclaimer, the term of this patent is extended or adjusted under 35 U.S.C. 154(b) by 0 days.

(21) Appl. No.: 13/469,560

(22) Filed: May 11, 2012

(65) Prior Publication Data
US 2012/0288427 A1 Nov. 15, 2012

Related U.S. Application Data

(60) Provisional application No. 61/485,654, filed on May 13, 2011.

(51) Int. Cl.
*B01D 46/00* (2006.01)
*B01D 53/94* (2006.01)
*B01J 23/40* (2006.01)
*B01J 35/04* (2006.01)
*B05D 7/22* (2006.01)
*F01N 3/10* (2006.01)
*F01N 3/28* (2006.01)

(52) U.S. Cl.
USPC .......... 423/213.2; 423/213.5; 423/213.7; 422/180; 427/230; 60/297; 60/299; 502/527.12; 95/273; 95/285; 55/DIG. 30

(58) Field of Classification Search
USPC ............... 423/213.2, 213.5, 213.7; 422/180; 427/230; 60/297, 299; 502/527.12; 55/DIG. 30; 95/273, 285
See application file for complete search history.

(56) References Cited

U.S. PATENT DOCUMENTS

| 7,722,829 | B2 | 5/2010 | Punke et al. |
| 7,947,238 | B2 * | 5/2011 | Deeba ............ 423/213.2 |
| 2008/0045405 | A1 | 2/2008 | Beutel et al. |
| 2009/0137386 | A1 | 5/2009 | Pfeifer et al. |
| 2009/0208394 | A1 | 8/2009 | Li |
| 2010/0183490 | A1 * | 7/2010 | Hoke et al. ............ 423/213.5 |

FOREIGN PATENT DOCUMENTS

| CN | 102006922 | 4/2011 |
| EP | 1541219 | 6/2005 |
| EP | 1837076 | 9/2007 |

OTHER PUBLICATIONS

Johansen, Keld et al., "Novel Base Metal-Palladium Catalytic Diesel Filter Coating with NO2 Reducing Properties", 2007, 9.

* cited by examiner

Primary Examiner — Timothy Vanoy
(74) Attorney, Agent, or Firm — Servilla Whitney LLC (57) ABSTRACT

Disclosed is a catalyzed soot filter with layered design wherein the first coating of the filter comprises an oxidation catalyst comprising platinum (Pt) and optionally palladium (Pd), wherein the second coating of the filter comprises an oxidation catalyst comprising Pd and optionally Pt, wherein the Pt concentration in the second coating is lower than the Pt concentration in the first coating, and wherein the weight ratio of Pt:Pd in the second coating is in the range of from 1:1 to 0:1; and wherein the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)).

29 Claims, 1 Drawing Sheet

CATALYZED SOOT FILTER WITH LAYERED DESIGN

CROSS-REFERENCE TO RELATED APPLICATIONS

This application claims priority under 35 U.S.C. §119(e) to U.S. Provisional No. 61/485,654, filed May 13, 2011, the disclosures of which are incorporated herein by reference in their entirety.

TECHNICAL FIELD

The present invention relates to a catalyzed soot filter, in particular for the treatment of Diesel engine exhaust, with a layered design which ensures soot particulates filtration, assists the oxidation of carbon monoxide and unburned hydrocarbons, and produces low $NO_2$ emissions during normal engine operations and active regeneration events.

BACKGROUND

Diesel engine exhaust is a heterogeneous mixture which contains not only gaseous emissions such as carbon monoxide ("CO"), unburned hydrocarbons ("HC") and nitrogen oxides ("NOx"), but also condensed phase materials, i.e. liquids and solids, which constitute the so-called particulates or particulate matter. Emissions treatment systems for diesel engines must treat all of the components of the exhaust to meet the emission standards set by the various regulatory agencies throughout the world.

The total particulate matter emissions of diesel exhaust contain three main components. One component is the solid, dry, solid carbonaceous fraction or soot fraction. This dry carbonaceous fraction contributes to the visible soot emissions commonly associated with diesel exhaust. A second component of the particulate matter is the soluble organic fraction ("SOF"). The SOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is the so-called sulfate fraction, which is formed from small quantities of sulfur components present in the diesel fuel.

Catalyst compositions and substrates on which the compositions are disposed are typically provided in diesel engine exhaust systems to convert certain or all of these exhaust components to innocuous components. For instance, oxidation catalysts that contain platinum group metals, base metals and combinations thereof facilitate the treatment of diesel engine exhaust by promoting the conversion of both unburned hydrocarbons (HC) and carbon monoxide (CO) gaseous pollutants, and some proportion of the particulate matter through oxidation of these pollutants to carbon dioxide and water. Such catalysts have generally been disposed on various substrates (e.g. honeycomb flow through monolith substrates), which are placed in the exhaust of diesel engines to treat the exhaust before it vents to the atmosphere. Certain oxidation catalysts also promote the oxidation of NO to $NO_2$.

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged.

This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The accumulating particles will increase the back pressure from the filter on the engine. Thus, the accumulating particles have to be continuously or periodically burned out of the filter to maintain an acceptable back pressure.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as $O_2$ or $NO_2$ to combust the particulate matter.

Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be actively generated though the use of upstream oxidation catalysts that oxidizes NO in the exhaust stream.

In spite of the presence of the catalyst compositions and provisions for using $NO_2$ as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to 570-630° C.

During the passive regeneration on current state of the art catalyzed soot filter, the $NO_2$ consumed during the oxidation of soot can be produced again by the catalyst assisted oxidation of NO along the channel of the catalyzed soot filter. In order to provide sufficient $NO_2$ to oxidize soot and avoid frequent active soot regenerations, Pt-rich washcoats have been applied on the soot filter material. However, such Pt-rich washcoats raise concerns due to risk of producing a high amount of $NO_2$ which would exit the catalyzed soot filter without being used for the oxidation of soot. The $NO_2$ exiting the catalyzed soot filter can be emitted in the atmosphere only if its concentration fulfills the requirements of the air regulation limits, otherwise its concentration has to be reduced or the $NO_2$ converted by means of further downstream catalysts such as NOx traps and/or catalysts able to selectively reduce NOx in presence of urea, ammonia or hydrocarbons. The need of abating the $NO_2$ emission is not only limited to the normal operation of a diesel engine but also during the so called active regenerations. In fact, during the high temperature oxidation of soot by oxygen, $NO_2$ produced on the Pt-rich washcoat can not be fully consumed by reaction with soot.

EP-A-1 541 219 discloses a catalyzed soot filter which would simultaneously remove soot and NOx by combination of NOx storage catalysts with the soot filter. This solution is however disadvantageous in that it additionally requires the use of another precious metal, e.g. Ag and/or base metal oxides, for the storage and conversion and/or release of NOx or to limit the $NO_2$ conversion, which not only add complexity and increase costs but also lead to a more sulfur sensitive system. In fact, the sulfur present in the commercially available diesel fuel could poison the activity of Ag, therefore forcing the system to be more frequently regenerated and thus to have a higher fuel penalty.

EP 1 837 076 A1 and JSAE 20077233 disclose a catalyzed soot filter formulation which suppresses the $NO_2$ formation during active filter regeneration as well as during normal diesel engine operation. Such suppression is achieved by the use of mixed base metal oxides e.g. Cu, La—Cu, Co and Fe oxides comprised in a PGM containing washcoat. Also in this case, the disadvantages come from the use of such base metal oxides which render the system more sulfur sensitive or less able to fully oxidize CO and HC.

Alternative methods to remove soot and NOx during the engine operation rely on the use of the so called SCR (selective catalytic reduction) catalysts, which can be separated from the soot filter or integrated into it. In both cases, these methods do not provide an optimal solution which could be widely applied. In fact, while separating the SCR catalysts from the catalyzed soot filters could be advantageous to specifically address the abatements of discrete components in the exhaust system, the increased cost, need of reductant and increased volume of such a system limits its applicability. On the other side, when the SCR catalyst is implemented into a catalyzed soot filter, although the system volume is reduced, there is an increased risk of having unacceptably high back pressure in the exhaust line as well as still the need of a reductant to be injected into the system.

Therefore, it would be desirable to provide an improved catalyzed soot filter which ensures oxidation of soot via $NO_2$ during normal diesel engine operation and also suppresses the $NO_2$ formation reaction during active regeneration. Moreover, it would be desirable to provide a catalyzed soot filter which ensures that the concentration of unconverted $NO_2$ exiting the catalyzed soot filter is as low as possible in order to fulfill the air regulation limits, preferably without the need of an additional NOx reduction system. Thus, the catalyzed soot filter should provide an economically more favorable $NO_2$ abatement. Additionally, it would be desirable to provide a catalyzed soot filter which, apart from controlling the $NO_2$ formation reaction, continually supports the oxidation and abatement of CO and unburned HC—and thus allows for a minimum breakthrough of HC and CO—as well as maintains its soot filtration capabilities. Finally, it would be desirable to provide a catalyzed soot filter which, due to the rarity and consequently costs of precious metal components usually used for the preparation of catalyzed soot filters, contains a reduced amount of platinum in the catalyst composition allowing for reduced costs for the catalyzed soot filter without reducing the filter efficiency.

SUMMARY

Provided according to an aspect of the invention is a catalyzed soot filter, comprising a wall flow substrate comprising an inlet end, an outlet end, a substrate axial length extending between the inlet end and the outlet end, and a plurality of passages defined by internal walls of the wall flow filter substrate;

wherein the plurality of passages comprise inlet passages having an open inlet end and a closed outlet end, and outlet passages having a closed inlet end and an open outlet end;

wherein a given inlet passage, an adjacent outlet passage, and the internal wall between said inlet and said outlet passage define an overall passage;

wherein the internal walls of at least 20% of the overall passages are at least partially coated with a first and a second coating;

wherein the internal wall of a given at least partially coated overall passage comprises the first coating that extends from the open inlet end to a first coating end, thereby defining a first coating length, wherein the first coating length is x % of the substrate axial length, with $20 \leq x \leq 100$;

wherein said internal wall of said overall passage further comprises the second coating located downstream of the first coating, said second coating having a second coating length of y % of the substrate axial length, with $20 \leq y \leq 100$;

wherein the first and the second coating overlap in length by at least 20% of the substrate axial length;

wherein the first coating comprises an oxidation catalyst comprising platinum (Pt) and optionally palladium (Pd) and wherein the weight ratio of Pt:Pd in the first coating is in the range of from 1:0 to greater than 1:1;

wherein the second coating comprises an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1;

wherein the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)).

Further provided in another aspect is a process for manufacturing such catalyzed soot filter, comprising the steps of
(i) providing a wall flow substrate, preferably having a porosity in the range of from 38 to 75, determined according to mercury porosity measurement according to DIN 66133, wherein the wall flow substrate is preferably a cordierite substrate or a silicon carbide substrate, said wall flow substrate comprising an inlet end, and outlet end, a substrate axial length extending between the inlet end and the outlet end, and a plurality of passages defined by the internal walls of the wall flow substrate;
wherein the plurality of passages comprise inlet passages having an open inlet end and a closed outlet end, and outlet passages having a closed inlet end and an open outlet end;
wherein a given inlet passage, an adjacent outlet passage, and the internal wall between said inlet and said outlet passage define an overall passage;

(ii) applying a first coating to at least part of the internal walls of at least 20% of the overall passages such that the first coating extends from the open inlet end to a first coating end whereby a first coating length is defined, wherein the first coating length is x % of the substrate axial length, with $20 \leq x \leq 100$, thereby adjusting the loading of the first coating to a predetermined value which is preferably in the range of from 0.05 to 1 g/inch$^3$ (g/(2.54 cm)$^3$), said first coating comprising an oxidation catalyst comprising platinum (Pt) and optionally palladium (Pd) wherein the weight ratio of Pt:Pd in the first coating is in the range of from 1:0 to greater than 1:1;

(iii) applying a second coating to at least part of the internal walls of said overall passages downstream of the first coating, said second coating having a second coating length of y % of the substrate axial length, with $20 \leq y \leq 100$, so that the first and the second coating overlap in length by at least 20% of the substrate axial length;

thereby adjusting the loading of the second coating to a predetermined value which is preferably in the range of from 0.05 to 1 g/inch$^3$ (g/(2.54 cm)$^3$) such that the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)), said second coating comprising an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1.

Yet further provided in another aspect is a system for treating a diesel engine exhaust stream, the system comprising an exhaust conduit in fluid communication with the diesel engine via an exhaust manifold;

a catalyzed soot as defined above; and one or more of the following in fluid communication with the catalyzed soot filter: a diesel oxidation catalyst (DOC), a selective catalytic reduction (SCR) article, a NOx storage and reduction (NSR) catalytic article.

Still further provided in yet another aspect is a method of treating a diesel engine exhaust stream, the exhaust stream containing soot particles, said method comprising contacting the exhaust stream with a catalyzed soot filter as defined above, preferably after having directed the exhaust stream through a diesel oxidation catalyst (DOC), said DOC preferably comprising a flow through substrate or a wall flow substrate.

DETAILED DESCRIPTION

An embodiment of the present invention relates to a catalyzed soot filter, comprising a wall flow substrate comprising an inlet end, an outlet end, a substrate axial length extending between the inlet end and the outlet end, and a plurality of passages defined by internal walls of the wall flow filter substrate;

wherein the plurality of passages comprise inlet passages having an open inlet end and a closed outlet end, and outlet passages having a closed inlet end and an open outlet end;

wherein a given inlet passage, an adjacent outlet passage, and the internal wall between said inlet and said outlet passage define an overall passage;

wherein the internal walls of at least 20% of the overall passages are at least partially coated with a first and a second coating;

wherein the internal wall of a given at least partially coated overall passage comprises the first coating that extends from the open inlet end to a first coating end, thereby defining a first coating length, wherein the first coating length is x % of the substrate axial length, with $20 \leq x \leq 100$;

wherein said internal wall of said overall passage further comprises the second coating located downstream of the first coating, said second coating having a second coating length of y % of the substrate axial length, with $20 \leq y \leq 100$;

wherein the first and the second coating overlap in length by at least 20% of the substrate axial length;

wherein the first coating comprises an oxidation catalyst comprising platinum (Pt) and optionally palladium (Pd) and wherein the weight ratio of Pt:Pd in the first coating is in the range of from 1:0 to greater than 1:1;

wherein the second coating comprises an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1;

wherein the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$_3$)).

According to an embodiment of the present invention, the internal walls of at least 20% of the overall passages are at least partially coated with a first and a second coating. Preferably, the internal walls of at least 40%, more preferably of at least 60%, and more preferably of at least 80%, preferably of 100% of the overall passages are at least partially coated with a first and a second coating.

According to an embodiment of the present invention, the second coating may extend from the open inlet end to a second coating end, thereby defining the second coating length of y % of the substrate axial length.

Therefore, an embodiment of the present invention also relates to the catalyzed soot filter defined above, wherein the second coating extends from the open inlet end to a second coating end, thereby defining the second coating length of y % of the substrate axial length.

According to an embodiment of the present invention, the second coating may extend from the open outlet end to a second coating end, thereby defining the second coating length of y % of the substrate axial length.

Therefore, an embodiment of the present invention also relates to the catalyzed soot filter defined above, wherein the second coating extends from the open outlet end to a second coating end, thereby defining the second coating length of y % of the substrate axial length.

Generally, there are no specific restrictions as far as the first coating length and the second coating length of the inventive catalyzed soot filter are concerned provided they are in the ranges defined above, and the first and the second coating overlap in length by at least 20% of the substrate axial length. Preferably, the first coating length is from 20 to 80%, more preferably from 20 to 70%, and more preferably from 20 to 60%, more preferably from 20 to 50% of the substrate axial length.

Therefore, an embodiment of the present invention also relates to the catalyzed soot filter defined above, wherein x is in the range of from 20 to 80, in particular from 20 to 50. Preferred values of x are, for example, in the range of from 20-30 or from 25-35 or from 30-40 or from 35-45 or from 40-50.

According to an embodiment of the present invention, the first coating length is x % of the substrate axial length with $20 \leq x \leq 100$, and the second coating length is y % of the substrate axial length with $20 \leq y \leq 100$, wherein the first and the second coating overlap in length by at least 20% of the substrate axial length. For example, the first and the second coating overlap in length by 20, 30 or 40% of the substrate axial length. Preferably, the first and the second coating overlap in length by 50 to 100%, more preferably from 60 to 100%, more preferably by 70 to 100%, and more preferably by 80 to 100%, even more preferably by 90 to 100%, more preferably by 100% of the substrate axial length.

According to an embodiment of the present invention, the first coating comprises an oxidation catalyst comprising Pt an optionally Pd. While it is generally conceivable that in addition to Pt and optionally Pd, the first coating further comprises at least one other oxidation catalyst such as at least one further platinum group metal such as ruthenium (Ru), rhodium (Rh), osmium (Os), and/or iridium (Ir), it is particularly preferred that the oxidation catalyst comprised in the first coating consists of Pt and optionally Pd.

Further according to an embodiment of the present invention, the second coating comprises an oxidation catalyst comprising Pd an optionally Pt. In particular, the Pt concentration in the second coating is lower than the Pt concentration in the first coating. While it is generally conceivable that in addition to Pd and optionally Pt, the second coating further comprises at least one other oxidation catalyst such as at least one further platinum group metal such as ruthenium (Ru), rhodium (Rh), osmium (Os), and/or iridium (Ir), it is particularly preferred that the oxidation catalyst comprised in the second coating consists of Pd and optionally Pt.

Therefore, an embodiment of the present invention also relates to the catalyzed soot filter defined above, wherein the oxidation catalyst comprised in the first coating consists of Pt and optionally Pd and the oxidation catalyst comprised in the second coating consists of Pd and optionally Pt wherein the Pt concentration in the second coating is lower than the Pt concentration in the first coating.

According to an embodiment of the present invention, the first coating and the second coating are present on the wall flow substrate at a coating loading ratio in the range of from 0.25 to 3, calculated as ratio of the loading of the first coating (in g/inch³ (g/(2.54 cm)³)): loading of the second coating (in g/inch³ (g/(2.54 cm)³)). The term "first coating" as used in this context of an embodiment of the present invention relates in particular to a washcoat suitably applied on the internal walls of the inlet passage of a given overall passage of the wall flow substrate. The term "second coating" as used in this context of an embodiment of the present invention relates in particular to a washcoat suitably applied on the internal walls downstream of the first coating of a given overall passage of the wall flow substrate. The term "downstream" as used in the context of the present application means that the second coating is located on the internal wall of an overall passage with respect to the first coating so that in region of overlap of first and second coating, the first coating comes into contact with exhaust gas before the second coating when the catalyzed soot filter is in operation. Further, the term "loading" of a given coating as used in the context of an embodiment of the present invention refers to a loading which is determined by weight measurement of the wall flow substrate used according to the present invention before and after having suitably applied the respective coating, followed by drying and calcination of the catalyzed soot filter as described hereinunder.

Preferably, the coating loading ratio of the catalyzed soot filter of an embodiment of the present invention is in the range of from more than 0.25 to less than 3, more preferably from 0.6 to 1.5, more preferably from 0.7 to 1.3, more preferably from 0.75 to 1.25, more preferably from 0.8 to 1.2, more preferably from 0.85 to 1.15, more preferably from 0.9 to 1.1, more preferably from 0.95 to 1.05. Thus, typical preferred values of the coating loading ratio are, for example, 0.95, 0.96, 0.97, 0.98, 0.99, 1.00, 1.01, 1.02, 1.03, 1.04, and 1.05.

Therefore, an embodiment of the present invention also relates to the catalyzed soot filter as defined above, wherein the coating loading ratio is in the range of from 0.75 to 1.25, preferably from 0.85 to 1.15, more preferably from 0.95 to 1.05.

Generally, there are no specific restrictions as far as the loading of the first coating and the loading of the second coating are concerned. With the proviso that the coating loading ratio is within above-mentioned preferred ranges, the loading of the first coating and the loading of the second coating can be chosen independently from each other. Preferably, the inventive catalyzed soot filter exhibits a first coating with a loading in the range of from 0.05 to 1 g/inch³ (g/(2.54 cm)³). Preferably, the first coating is present with a loading in the range of from 0.06 to 0.9, more preferably from 0.07 to 0.8, more preferably from 0.08 to 0.7, more preferably from 0.09 to 0.6, and even more preferably from 0.1 to 0.5 g/inch³ (g/(2.54 cm)³). Even more preferably, the first coating is present with a loading in the range of from 0.15 to 0.4, more preferably from 0.2 to 0.3 g/inch³ (g/(2.54 cm)³). Typical values of the loading of the first coating are, for example, 0.20 or 0.22 or 0.24 or 0.25 or 0.26 or 0.28 or 0.30. Preferably, the inventive catalyzed soot filter exhibits a second coating with a loading in the range of from 0.05 to 1 g/inch³ (g/(2.54 cm)³). Preferably, the second coating is present with a loading in the range of from 0.06 to 0.9, more preferably from 0.07 to 0.8, more preferably from 0.08 to 0.7, more preferably from 0.09 to 0.6, and even more preferably from 0.1 to 0.5 g/inch³ (g/(2.54 cm)³). Even more preferably, the second coating is present with a loading in the range of from 0.15 to 0.4, more preferably from 0.2 to 0.3 g/inch³ (g/(2.54 cm)³). Typical values of the loading of the second coating are, for example, 0.20 or 0.22 or 0.24 or 0.25 or 0.26 or 0.28 or 0.30. It is further preferred that the loading of the first coating is essentially the same, more preferably the same as the loading of the second coating.

Therefore, an embodiment of the present invention relates to the catalyzed soot filter as defined above, wherein the loading of the first coating is in the range of from 0.05 to 1, preferably from 0.1 to 0.5, more preferably from 0.2 to 0.3 g/inch³ (g/(2.54 cm)³), and wherein the loading of the second coating is in the range of from 0.05 to 1, preferably from 0.1 to 0.5, more preferably from 0.2 to 0.3 g/inch³ (g/(2.54 cm)³).

According to an embodiment of the present invention, the first coating comprises an oxidation catalyst comprising platinum (Pt) and optionally palladium (Pd). Preferably, the oxidation catalyst comprised in the first coating comprises, even more preferably consists of Pt and Pd. The weight ratio of Pt:Pd is preferably in the range of from 1:0 to greater than 1:1, more preferably from 1:0 to 2:1, more preferably from 1:0 to 3:1, more preferably from 1:0 to 4:1, and even more preferably from 1:0 to 5:1.

It is further preferred that the oxidation catalyst comprised in the first coating comprises lower amounts of Pd relative to Pt. It is conceived that in particular, first coatings are preferred comprising, as oxidation catalyst, only Pt.

Therefore, an embodiment of the present inventions also relates to a catalyzed soot filter wherein in the first coating, the weight ratio of Pt:Pd is in the range of from 1:0 to greater than 1:1, preferably from 1:0 to 2:1, more preferably from 1:0 to 3:1, more preferably from 1:0 to 4:1, and even more preferably from 1:0 to 5:1, the weight ratio of Pt:Pd more preferably being 1:0.

According to an embodiment of the present invention, the second coating comprises an oxidation catalyst comprising palladium (Pd) and optionally platinum (Pt). Preferably, the oxidation catalyst comprised in the second coating comprises, even more preferably consists of Pd and Pt. The weight ratio of Pt:Pd is preferably in the range of from 1:1 to 0:1, more preferably from 1:2 to 0:1, more preferably from 1:3 to 0:1, more preferably from 1:4 to 0:1, and even more preferably from 1:5 to 0:1.

It is further preferred that the oxidation catalyst comprised in the second coating comprises lower amounts of Pt relative to Pd. It is conceived that in particular, second coatings are preferred comprising, as oxidation catalyst, only Pd.

Therefore, an embodiment of the present inventions also relates to a catalyzed soot filter wherein in the second coating, the weight ratio of Pt:Pd is in the range of from 1:1 to greater than 0:1, preferably from 1:2 to 0:1, more preferably from 1:3 to 0:1, more preferably from 1:4 to 0:1, and even more preferably from 1:5 to 0:1, the weight ratio of Pt:Pd more preferably being 0:1.

Generally, the weight ratios of the sum of the weights of Pt and optionally Pd in the first coating on the one hand and the weights of the sum of Pd and optionally Pt in the second coating on the other hand can be suitably chosen provided that the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)), or the respective preferred ranges as defined above, and further provided that the Pt concentration in the second coating is lower than the Pt concentration in the first coating. According to the present invention, the weight ratio of the sum of the weights of Pt and optionally Pd in the first coating to the sum of the weights of Pd and optionally Pt in the second coating is in the range of from 1:6 to 10:1.

Preferably, the weight ratio of the sum of the weights of Pt and optionally Pd in the first coating relative to the sum of the weights of Pd and optionally Pt in the second coating is in the range of from 1:6 to 2:1. More preferably, this weight ratio is in the range of from 1:5 to 1.7:1, more preferably from 1:4 to 1.3:1, more preferably from 1:3 to 1:1.

Therefore, an embodiment of the present invention also relates to the catalyzed soot filter as defined above, wherein the weight ratio of the sum of the weights of Pt and optionally Pd in the first coating to the sum of the weights of Pd and optionally Pt in the second coating is in the range of from 1:6 to 2:1, preferably from 1:3 to 1:1.

In particular, catalyzed soot filters are preferred which have first coatings wherein the oxidation catalyst consists of Pt, i.e. first coatings being free of Pd and platinum group metals other than Pt. Further, catalyzed soot filters are preferred which have second coatings wherein the oxidation catalyst consists of Pd, i.e. second coatings being free of Pt and platinum group metals other than Pd.

While there are no specific restrictions as far as the Pt concentration in the first coating is concerned, preferred Pt concentrations are in the range of from 0.3 to 2 g/ft$^3$ (g/(30.48 cm)$^3$), more preferably from 0.4 to 1.5 g/ft$^3$ (g/(30.48 cm)$^3$), even more preferably from 0.5 to 1 g/ft$^3$ (g/(30.48 cm)$^3$). While there are no specific restrictions as far as the Pd concentration is concerned, preferred Pd concentrations are in the range of from 0.3 to 5 g/ft$^3$ (g/(30.48 cm)$^3$), more preferably from 0.4 to 4 g/ft$^3$ (g/(30.48 cm)$^3$), even more preferably from 0.5 to 3 g/ft$^3$ (g/(30.48 cm)$^3$).

Therefore, an embodiment of the present invention also relates to a catalyzed soot filter as defined above, wherein in the first coating, the weight ratio of Pt:Pd is 1:0 and the concentration of Pt is in the range of from 0.5 to 1 g/ft$^3$ (g/(30.48 cm)$^3$), and wherein in the second coating, the weight ratio of Pt:Pd is 0:1 and the concentration of Pd is in the range of from 0.5 to 3 g/ft$^3$ (g/(30.48 cm)$^3$).

It is further preferred that the weight ratio of the sum of the weights of Pt and optionally Pd in the first coating relative to the sum of the weights of Pd and optionally Pt in the second coating is in the range of from 2.4:1 to 10:1. More preferably, this weight ratio is in the range of from 2.5:1 to 9.5:1, more preferably from 3:1 to 9:1, more preferably from 4:1 to 8.5:1, more preferably from 5:1 to 8:1.

Therefore, an embodiment of the present invention also relates to a catalyzed soot filter as defined above, wherein the weight ratio of the sum of the weights of Pt and optionally Pd in the first coating to the sum of the weight of Pd and optionally Pt in the second coating is in the range of from 2.4:1 to 10:1, preferably from 5:1 to 8:1.

In particular, catalyzed soot filters are preferred which have first coatings wherein the weight ratio of Pt:Pd is in the range of from 1:0 to greater than 1:1 such as, for example, from 50:1 to greater than 1:1 or from 20:1 to greater than 1:1 or from 10:1 to greater than 1:1 or from 5:1 to greater than 1:1 or from 2:1 to greater than 1:1.

Further, catalyzed soot filters are preferred which have second coatings wherein the weight ratio of Pt:Pd is in the range of from 0:1 to 1:1 such as, for example, from 1:50 to 1:1 or from 1:20 to 1:1 or from 1:10 to 1:1 or from 1:5 to 1:1 of from 1:2 to 1.1. Most preferably, the Pt:Pd weight ratio in the second coating is 0:1.

While there are no specific restrictions as far as the Pt concentration in the first coating is concerned, preferred Pt concentrations are in the range of from 5 to 100 g/ft$^3$ (g/(30.48 cm)$^3$), more preferably from 10 to 60 g/ft$^3$ (g/(30.48 cm)$^3$), even more preferably from 15 to 40 g/ft$^3$ (g/(30.48 cm)$^3$), such as from 20 to 40 g/ft$^3$ (g/(30.48 cm)$^3$) or from 25 to 30 g/ft$^3$ (g/(30.48 cm)$^3$). While there are no specific restrictions as far as the Pd concentration in the second coating is concerned, preferred Pd concentrations are in the range of from 1 to 30 g/ft$^3$ (g/(30.48 cm)$^3$), more preferably from 5 to 25/ft$^3$ (g/(30.48 cm)$^3$), even more preferably from 10 to 20 g/ft$^3$ (g/(30.48 cm)$^3$).

Therefore, an embodiment of the present invention also relates to a catalyzed soot filter as defined above, wherein in the first coating, the weight ratio of Pt:Pd is in the range of from 1:0 to greater than 1:1, preferably 1:0, and the concentration of Pt is in the range of from 5 to 100 g/ft$^3$ (g/(30.48 cm)$^3$), preferably from 10 to 60 g/ft$^3$ (g/(30.48 cm)$^3$), more preferably from 15 to 40 g/ft$^3$ (g/(30.48 cm)$^3$), and wherein in the second coating, the weight ratio of Pt:Pd is in the range of from 0:1 to 1:1, preferably 0:1, and the concentration of Pd is in the range of from 1 to 30 g/ft³ (g/(30.48 cm)³), preferably from 5 to 25 g/ft³ (g/(30.48 cm)³), more preferably from 10 to 20 g/ft³ (g/(30.48 cm)³).

Catalyzed soot filters which are especially preferred in the context of an embodiment of the present invention are characterized in that the second coating comprises an oxidation catalyst which consists of Pd and which is free of Pt and also free of platinum group metals other than Pd and Pt. As to the first coating, it is preferred that apart from Pt and optionally also Pd, no platinum group metals other than Pt and optionally Pd are comprised.

Therefore, an embodiment of the present invention also relates to a catalyzed soot filter as defined above, wherein the oxidation catalyst comprised in the first coating consists of Pt and optionally Pd and the oxidation catalyst comprised in the second coating consists of Pd.

According to an embodiment of the present invention, the first coating preferably comprises at least one porous support material for the respective platinum group metal(s). While there are no specific restrictions, it is preferred that the porous support material is a refractory metal oxide. More preferably, the porous support material of the first coating is selected from the group consisting of alumina, zirconia, silica, titania, a rare earth metal oxide such as an oxide of cerium, praseodymium, lanthanum, neodymium, hafnium and samarium, silica-alumina, alumina-zirconia, alumina-chromia, alumina-rare earth metal oxide, titania-silica, titania-zirconia, titania-alumina, ceria-zirconia, and a mixture of two or more thereof. More preferably, the at least one porous support material is selected from the group consisting of $Al_2O_3$, $ZrO_2$, $CeO_2$, $SiO_2$, $La_2O_3$, $Pr_6O_{11}$, $HfO_2$ and a mixture of tow or more thereof. Most preferably, the at least one support material comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %.

According to an embodiment of the present invention, the second coating preferably comprises at least one porous support material for the respective platinum group metal(s). While there are no specific restrictions, it is preferred that the porous support material is a refractory metal oxide. More preferably, the porous support material of the second coating is selected from the group consisting of alumina, zirconia, silica, titania, a rare earth metal oxide such as an oxide of cerium, praseodymium, lanthanum, neodymium, hafnium and samarium, silica-alumina, alumina-zirconia, alumina-chromia, alumina-rare earth metal oxide, titania-silica, titania-zirconia, titania-alumina, ceria-zirconia, and a mixture of two or more thereof. More preferably, the at least one porous support material is selected from the group consisting of $Al_2O_3$, $ZrO_2$, $CeO_2$, $SiO_2$, $La_2O_3$, $Pr_6O_{11}$, $HfO_2$ and a mixture of tow or more thereof. Most preferably, the at least one support material comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %.

Therefore, an embodiment of the present invention also relates to a catalyzed soot filter as described hereinabove, wherein the first coating and the second coating comprise at least one porous support material, wherein the at least one porous support material of the first coating comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %, and wherein the at least one porous support material of the second coating comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %.

According to an embodiment of the present invention, it is further preferred that the refractory metal oxide of the first coating and/or the second coating comprises alumina, more preferably gamma alumina or activated alumina, such as gamma or eta alumina. Preferably, the activated alumina has a specific surface area, determined according to BET surface area measurements, of from 60 to 300 m²/g, preferably from 90 to 200 m²/g, mostly preferred from 100 to 180 m²/g.

Therefore, an embodiment of the present invention also relates to a catalyzed soot filter as defined above, wherein the support material of the first coating comprises $Al_2O_3$, preferably gamma-$Al_2O_3$, and wherein the support material of the second coating comprises $Al_2O_3$, preferably gamma-$Al_2O_3$.

Typically, any structure types of zeolites/aluminosilicates can also be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON or a mixture of one or more thereof.

The zeolite can be a natural or synthetic zeolite such as faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, or a beta zeolite. Preferred zeolite materials have a high silica to alumina ratio. The zeolites may have a silica/alumina molar ratio of from at least 25/1, preferably at least 50/1, with useful ranges of from 25/1 to 1000/1, 50/1 to 500/1 as well as 25/1 to 300/1, from 100/1 to 250/1, or alternatively from 35/1 to 180/1 is also exemplified. Preferred zeolites include ZSM, Y and beta zeolites. A particularly preferred beta zeolite is of the type disclosed in U.S. Pat. No. 6,171,556.

Wall flow substrates useful for the catalyzed soot filter of an embodiment of the present invention have a plurality of fine, substantially parallel flow passages extending along the longitudinal axis of the substrate. Each passage is blocked at one end of the substrate body, with alternate passages blocked at opposite end-faces. Such monolithic carriers may contain up to about 400 flow passages (or "cells") per square inch ((2.54 cm)²) of cross section, although far fewer may be used. For example, the carrier may have from 7 to 400, preferably from 100 to 400, cells per square inch ("cpsi"). The cells can have cross sections that are rectangular, square, circular, oval, triangular, hexagonal, or are of other polygonal shapes.

Preferred wall flow substrates are composed of ceramic-like materials such as cordierite, alpha-alumina, silicon carbide, silicon nitride, zirconia, mullite, spodumene, alumina-silica-magnesia or zirconium silicate, or of refractory metals such as stainless steel. Preferred wall flow substrates are formed from cordierite and silicon carbide. Such materials are able to withstand the environment, particularly high temperatures, encountered in treating the exhaust streams. Ceramic wall flow substrates are typically formed of a material having a porosity of about 40 to 70. The term "porosity" as used in this context is understood as being determined according to mercury porosity measurement according to DIN 66133. According to the present invention, wall flow substrates are preferred having a porosity in the range from 38 to 75.

Therefore, an embodiment of the present invention also relates to a catalyzed soot filter as defined above, wherein the wall flow substrate has a porosity in the range of from 38 to 75, determined according to mercury porosity measurement according to DIN 66133, wherein the wall flow substrate is preferably a cordierite substrate or a silicon carbide substrate.

For instance, a wall flow substrate having a porosity of 55-65 and a mean pore diameter of about 15-25 microns provide adequate exhaust flow. Preferred configurations use wall flow substrates with 100 cpsi that have a 17 mil wall (1 mil corresponds to 0.0254 mm), and wall flow substrates with 300 cpsi and a 12-14 mil wall.

Generally, there are no restrictions as to the substrate axial lengths of the catalyzed soot filter of the present invention. Substrate axial lengths will mainly depend on the intended use of the catalyzed soot filter of the present invention. Typical substrate axial lengths of catalyzed soot filter used, for example, in the automotive area are in the range of from 4 to 10 inches (10.16 cm to 25.4 cm), preferably from 6 to 8 inches (15.24 cm to 20.32 cm).

Each of the coatings of an embodiment of the present invention present on the wall flow substrate is formed from a respective washcoat composition that contains the at least one porous support material as described above. Other additives such as binders and stabilizers can also be included in the washcoat composition. Such stabilizers can be included in either the first coating or in the second coating or in both first and second coatings, as described hereinunder. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from at least one alkaline earth metal components selected from the group consisting of magnesium, barium, calcium and strontium, preferably strontium and barium. When present, stabilizers materials are added at from about 0.01 g/in$^3$ (g/(2.54 cm)$^3$) to 0.15 g/in$^3$ (g/(2.54 cm)$^3$) in the coating.

A given coating is disposed on the surface of the internal walls. Further, it is conceivable that a given coating is disposed on another coating which had been applied onto the surface of the internal walls or onto yet another coating. Further, a given coating may partially permeate the porous internal walls or the coating onto which it is applied.

For the preparation of the washcoat composition to be applied onto the internal walls of the wall flow substrate, it is preferred to disperse a suitable Pt and/or Pd component precursor on a suitable porous support material, preferably a suitable refractory metal oxide as described hereinabove. More preferably, a water-soluble or water-dispersible Pt and/or Pd component precursor is/are impregnated on a suitable porous support material, preferably a suitable refractory metal oxide, followed by drying and fixing steps. Suitable Pt and/or Pd component precursors include, for example, potassium platinum chloride, ammonium platinum thiocyanate, amine-solubilized platinum hydroxide, chloroplatinic acid, palladium nitrate, and the like. Other suitable precursors will be apparent to those of skill in the art. The impregnated support material is preferably dried with the Pt and/or Pd component fixed thereon. Generally, drying temperatures are in the range from 60 to 250° C., preferably from 90 to 210° C., more preferably from 100 to 150° C. Drying can be carried out in any suitable atmosphere, with N$_2$ or air being preferred. After drying, it is preferred to finally fix the Pt and/or Pd component on the support material by suitable calcination and/or other suitable methods such as treatment with acetic acid. In general, any method resulting in the Pt and/or Pd component being in water-insoluble form is suitable. Generally, calcination temperatures are in the range from 250 to 800° C., preferably from 350 to 700° C., more preferably from 400 to 600° C. Calcination can be carried out in any suitable atmosphere, with N$_2$ or air being preferred. By, for example, calcination, the catalytically active elemental Pt and/or Pd or the respective oxide is obtained. It is to be understood that the term "Pt component" or "Pd component" present in the finally obtained catalyzed soot filter as used in the context of the present invention relates to the Pt and/or Pd component in the form of the catalytically active elemental Pt and/or Pd, or the oxide thereof, or the mixture of elemental Pt and/or Pd and the oxide thereof.

Therefore, an embodiment of the present invention also relates to a process for manufacturing a catalyzed soot filter as defined above, the process comprising the steps of (i) providing a wall flow substrate, preferably having a porosity in the range of from 38 to 75, determined according to mercury porosity measurement according to DIN 66133, wherein the wall flow substrate is preferably a cordierite substrate or a silicon carbide substrate, said wall flow substrate comprising an inlet end, and outlet end, a substrate axial length extending between the inlet end and the outlet end, and a plurality of passages defined by the internal walls of the wall flow substrate;

wherein the plurality of passages comprise inlet passages having an open inlet end and a closed outlet end, and outlet passages having a closed inlet end and an open outlet end;

wherein a given inlet passage, an adjacent outlet passage, and the internal wall between said inlet and said outlet passage define an overall passage;

(ii) applying a first coating to at least part of the internal walls of at least 20% of the overall passages such that the first coating extends from the open inlet end to a first coating end whereby a first coating length is defined, wherein the first coating length is x % of the substrate axial length, with $20 \leq x \leq 100$, thereby adjusting the loading of the first coating to a predetermined value which is preferably in the range of from 0.05 to 1 g/inch$^3$ (g/(2.54 cm)$^3$), said first coating comprising an oxidation catalyst comprising platinum (Pt) and optionally palladium (Pd) wherein the weight ratio of Pt:Pd in the first coating is in the range of from 1:0 to greater than 1:1;

(iii) applying a second coating to at least part of the internal walls of said overall passages downstream of the first coating, said second coating having a second coating length of y % of the substrate axial length, with $20 \leq y \leq 100$, so that the first and the second coating overlap in length by at least 20% of the substrate axial length;

thereby adjusting the loading of the second coating to a predetermined value which is preferably in the range of from 0.05 to 1 g/inch$^3$ (g/(2.54 cm)$^3$) such that the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)), said second coating comprising an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1.

According to an embodiment of the present invention, step (iii) may be carried out before step (ii) whereby the second coating is applied such that it extends from the open inlet end to a second coating end, thereby defining the second coating length of y % of the substrate axial length.

Therefore, an embodiment of the present invention also relates to a process for manufacturing a catalyzed soot filter as defined above, wherein step (iii) is carried out before step (ii) and wherein the second coating is applied such that it extends from the open inlet end to a second coating end, thereby defining the second coating length of y % of the substrate axial length.

According to an embodiment of the present invention, step (iii) may be carried out before, simultaneously with or after step (ii) whereby the second coating is applied such that it extends from the open outlet end to a second coating end, thereby defining the second coating length of y % of the substrate axial length.

Therefore, an embodiment of the present invention also relates to a process for manufacturing a catalyzed soot filter as defined above, wherein step (iii) is carried out before, simultaneously with or after step (ii) and wherein the second coating is applied such that it extends from the open outlet end to a second coating end, thereby defining the second coating length of y % of the substrate axial length.

Preferred values of the ranges, lengths, concentrations and the like, as far as the inventive catalyzed soot filters are concerned, are as defined above.

The catalyzed soot filter of an embodiment of the present invention can be used in an integrated emission treatment system, in particular in an exhaust conduit comprising one or more additional components for the treatment of diesel exhaust emissions. For example, such exhaust conduit which is most preferably in fluid communication with the diesel engine may comprise a catalyzed soot filter according to the present invention and may further comprise a diesel oxidation catalyst (DOC) article and/or a selective catalytic reduction (SCR) article and/or an NOx storage and reduction (NSR) catalytic article. Most preferably, the DOC article and/or the SCR article and/or the NSR article are in fluid communication with the catalyzed soot filter. The diesel oxidation catalyst can be located upstream or downstream from the catalyzed soot filter and/or selective catalytic reduction component. More preferably, the catalyzed soot filter of the present invention is located downstream from the DOC article. Still more preferably the catalyzed soot filter of the present invention is located either upstream or downstream of the SCR article.

Therefore, an embodiment of the present invention also relates to the catalyzed soot filter as defined above, comprised in a system for treating a diesel engine exhaust stream, the system further comprising an exhaust conduit in fluid communication with the diesel engine via an exhaust manifold, and further comprising one or more of the following in fluid communication with the catalyzed soot filter: a diesel oxidation catalyst (DOC), a selective catalytic reduction (SCR) article, an NOx storage and reduction (NSR) catalytic article. Even more preferably, downstream the inventive catalyzed soot filter, there is no NOx reduction catalytic article comprised in the system, preferably no NOx storage and reduction (NSR) catalytic article.

A suitable SCR article for use in the exhaust conduit is typically able to catalyze the reaction of $O_2$ with any excess $NH_3$ to $N_2$ and $H_2O$, so that $NH_3$ is not emitted to the atmosphere. Useful SCR catalyst compositions used in the exhaust conduit should also have thermal resistance to temperatures greater than 650° C. Such high temperatures may be encountered during regeneration of the upstream catalyzed soot filter. Suitable SCR articles are described, for instance, in U.S. Pat. Nos. 4,961,917 and 5,516,497. Suitable SCR articles include one or both of an iron and a copper promoter typically present in a zeolite in an amount of from about 0.1 to 30 percent by weight, preferably from about 1 to 5 percent by weight, of the total weight of promoter plus zeolite. Typical zeolites may exhibit a CHA framework structure.

According to an embodiment of the present invention, the inventive catalyzed soot filter is preferably arranged downstream of the DOC. In such an arrangement, the inventive catalyzed soot filter provides the advantage that HC and CO are reduced during soot combustion which is most preferably achieved by the upstream zone of the inventive filter. Further, the specific design of the rear zone ensures that in the downstream zone of the catalyzed soot filter, as low an amount of NOx as possible is generated. Thus, downstream such DOC, it was found that the inventive catalyzed soot filter is very advantageous in its clean-up function for the treatment of diesel exhaust.

Therefore, an embodiment of the present invention also relates to the catalyzed soot filter as defined above, comprised in a system for treating a diesel engine exhaust stream, the system further comprising an exhaust conduit in fluid communication with the diesel engine via an exhaust manifold, and further comprising a diesel oxidation catalyst wherein the catalyzed soot filter is arranged downstream of the DOC.

Also, an embodiment of the present invention relates to the catalyzed soot filter as defined above for use in a method of treating a diesel engine exhaust stream, the exhaust stream containing soot particles, said method comprising contacting the exhaust stream with the catalyzed soot filter, preferably after having directed the exhaust stream through a diesel oxidation catalyst (DOC), said DOC preferably comprising a flow through substrate or a wall flow substrate. Similarly, an embodiment of the present invention relates to the use of the catalyzed soot filter as defined above for treating a diesel engine exhaust stream, the exhaust stream containing soot particles, wherein the exhaust stream is contacted with the catalyzed soot filter, preferably after having directed the exhaust stream through a diesel oxidation catalyst (DOC), said DOC preferably comprising a flow through substrate or a wall flow substrate.

Further, an embodiment of the present invention relates to a system for treating for treating a diesel engine exhaust stream, the system comprising an exhaust conduit in fluid communication with the diesel engine via an exhaust manifold; a catalyzed soot filter as defined above; and one or more of the following in fluid communication with the catalyzed soot filter: a diesel oxidation catalyst (DOC), a selective catalytic reduction (SCR) article, a NOx storage and reduction (NSR) catalytic article.

Preferably, in this system, the catalyzed soot filter is arranged downstream of the DOC. More preferably, the system does not contain a NOx reduction catalytic article, and more preferably, the system does not contain a NOx storage and reduction (NSR) catalytic article.

Therefore, an embodiment of the present invention also relates to a method of treating a diesel engine exhaust stream, the exhaust stream containing soot particles, said method comprising contacting the exhaust stream with a catalyzed soot filter as defined above, preferably after having directed the exhaust stream through a diesel oxidation catalyst (DOC), said DOC preferably comprising a flow through substrate or a wall flow substrate.

According to an embodiment of the present invention, this method optionally further comprises directing the exhaust stream resulting from the DOC or from the catalyzed soot filter through a selective catalytic reduction (SCR) article.

The present invention include the following embodiments, wherein these include the specific combinations of embodiments as indicated by the respective interdependencies defined therein:

1. A catalyzed soot filter, comprising
    a wall flow substrate comprising an inlet end, an outlet end, a substrate axial length extending between the inlet end and the outlet end, and a plurality of passages defined by internal walls of the wall flow filter substrate;
    wherein the plurality of passages comprise inlet passages having an open inlet end and a closed outlet end, and outlet passages having a closed inlet end and an open outlet end;
    wherein a given inlet passage, an adjacent outlet passage, and the internal wall between said inlet and said outlet passage define an overall passage;
    wherein the internal walls of at least 20% of the overall passages are at least partially coated with a first and a second coating;
    wherein the internal wall of a given at least partially coated overall passage comprises the first coating that extends from the open inlet end to a first coating end, thereby defining a first coating length, wherein the first coating length is x % of the substrate axial length, with $20 \leq x \leq 100$;
    wherein said internal wall of said overall passage further comprises the second coating located downstream of the first coating, said second coating having a second coating length of y % of the substrate axial length, with $20 \leq y \leq 100$;
    wherein the first and the second coating overlap in length by at least 20% of the substrate axial length;
    wherein the first coating comprises an oxidation catalyst comprising platinum (Pt) and optionally palladium (Pd) and wherein the weight ratio of Pt:Pd in the first coating is in the range of from 1:0 to greater than 1:1;
    wherein the second coating comprises an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1;
    wherein the first coating and the second coating are present on the wall flow substrate at a coating loading ratio in the range of from 0.25 to 3, calculated as ratio of the loading of the first coating (in g/inch³ (g/(2.54 cm)³)): loading of the second coating (in g/inch³ (g/(2.54 cm)³)).
2. The catalyzed soot filter according to embodiment 1, wherein the second coating extends from the open inlet end to a second coating end, thereby defining the second coating length of y % of the substrate axial length.
3. The catalyzed soot filter according to embodiment 1, wherein the second coating extends from the open outlet end to a second coating end, thereby defining the second coating length of y % of the substrate axial length.
4. The catalyzed soot filter of any of embodiments 1 to 3, wherein x is in the range of from 20 to 80, preferably from 20 to 50.
5. The catalyzed soot filter of any of embodiments 1 to 4, wherein the coating loading ratio is in the range of from 0.75 to 1.25, preferably from 0.85 to 1.15, more preferably from 0.95 to 1.05.
6. The catalyzed soot filter of any of embodiment 1 to 5, wherein the loading of the first coating is in the range of from 0.05 to 1, preferably from 0.1 to 0.5, more preferably from 0.2 to 0.3 g/inch³ (g/(2.54 cm)³), and wherein the loading of the second coating is in the range of from 0.05 to 1, preferably from 0.1 to 0.5, more preferably from 0.2 to 0.3 g/inch³ (g/(2.54 cm)³).
7. The catalyzed soot filter of any of embodiments 1 to 6, wherein in the first coating, the weight ratio of Pt:Pd is in the range of from 1:0 to 2:1, preferably from 1:0 to 5:1.
8. The catalyzed soot filter of any of embodiments 1 to 7, wherein in the first coating, the weight ratio of Pt:Pd is 1:0.
9. The catalyzed soot filter of any of embodiments 1 to 8, wherein in the second coating, the weight ratio of Pt:Pd is in the range of from 1:2 to 0:1, preferably from 1:5 to 0:1.
10. The catalyzed soot filter of any of embodiments 1 to 9, wherein in the second coating, the weight ratio of Pt:Pd is 0:1.
11. The catalyzed soot filter of any of embodiments 1 to 10, wherein the weight ratio of the sum of the weights of Pt and optionally Pd in the first coating to the sum of the weights of Pd and optionally Pt in the second coating is in the range of from 1:6 to 10:1.
12. The catalyzed soot filter of embodiment 11, wherein the weight ratio of the sum of the weights of Pt and optionally Pd in the first coating to the sum of the weights of Pd and optionally Pt in the second coating is in the range of from 1:6 to 2:1, preferably from 1:3 to 1:1.
13. The catalyzed soot filter of embodiment 12, wherein in the first coating, the weight ratio of Pt:Pd is 1:0 and the concentration of Pt is in the range of from 0.5 to 1 g/ft³ (g/(30.48 cm)³), and wherein in the second coating, the weight ratio of Pt:Pd is 0:1 and the concentration of Pd is in the range of from 0.5 to 3 g/ft³ (g/(30.48 cm)³).
14. The catalyzed soot filter of embodiment 11, wherein the weight ratio of the sum of the weights of Pt and optionally Pd in the first coating to the sum of the weights of Pd and optionally Pt in the second coating is in the range of from 2.4:1 to 10:1, preferably from 5:1 to 8:1.
15. The catalyzed soot filter of embodiment 14, wherein in the first coating, the weight ratio of Pt:Pd is in the range of from 1:0 to 1:1, preferably 1:0, and the concentration of Pt is in the range of from 5 to 100 g/ft³ (g/(30.48 cm)³), preferably from 10 to 60 g/ft³ (g/(30.48 cm)³), more preferably from 15 to 40 g/ft³ (g/(30.48 cm)³), and wherein in the second coating, the weight ratio of Pt:Pd is in the range of from 0:1 to 1:1, preferably 0:1, and the concentration of Pd is in the range of from 1 to 30 g/ft³ (g/(30.48 cm)³), preferably from 5 to 25 g/ft³ (g/(30.48 cm)³), more preferably from 10 to 20 g/ft³ (g/(30.48 cm)³).
16. The catalyzed soot filter of any of embodiments 1 to 15, wherein the oxidation catalyst comprised in the first coating consists of Pt and optionally Pd and the oxidation catalyst comprised in the second coating consists of Pd.
17. The catalyzed soot filter of any of embodiments 1 to 16, wherein the first coating and the second coating comprise at least one porous support material for the respective platinum group metal(s), wherein the at least one porous support material of the first coating comprises a ceria-zirconia material consisiting of CeO$_2$: 45 wt %, ZrO$_2$: 43.5 wt %, La$_2$O$_3$: 8 wt %, Pr$_6$O$_{11}$: 2 wt %, and HfO$_2$: 1.5 wt %, and wherein the at least one porous support material of the second coating comprises a ceria-zirconia material consisting of CeO$_2$: 45 wt %, ZrO$_2$: 43.5 wt %, La$_2$O$_3$: 8 wt %, Pr$_6$O$_{11}$: 2 wt %, and HfO$_2$: 1.5 wt %.
18. The catalyzed soot filter of embodiment 17, wherein the support material of the first coating comprises Al$_2$O$_3$, preferably gamma-Al$_2$O$_3$, and wherein the support material of the second coating comprises Al$_2$O$_3$, preferably gamma-Al$_2$O$_3$.

19. The catalyzed soot filter of any of embodiments 1 to 18, wherein the wall flow substrate has a porosity in the range of from 38 to 75, determined according to mercury porosity measurement according to DIN 66133, wherein the wall flow substrate is preferably a cordierite substrate or a silicon carbide substrate.

20. The catalyzed soot filter of any of embodiments 1 to 19, comprised in a system for treating a diesel engine exhaust stream, the system further comprising an exhaust conduit in fluid communication with the diesel engine via an exhaust manifold, and further comprising one or more of the following in fluid communication with the catalyzed soot filter: a diesel oxidation catalyst (DOC), a selective catalytic reduction (SCR) article, an NOx storage and reduction (NSR) catalytic article.

21. The catalyzed soot filter of embodiment 20, arranged downstream of the DOC.

22. The catalyzed soot filter of any of embodiments 1 to 21 for use in a method of treating a diesel engine exhaust stream, the exhaust stream containing soot particles, said method comprising contacting the exhaust stream with the catalyzed soot filter, preferably after having directed the exhaust stream through a DOC, said DOC preferably comprising a flow through substrate or a wall flow substrate.

23. A process for manufacturing a catalyzed soot filter of any of embodiments 1 to 19, comprising the steps of
  (i) providing a wall flow substrate, preferably having a porosity in the range of from 38 to 75, determined according to mercury porosity measurement according to DIN 66133, wherein the wall flow substrate is preferably a cordierite substrate or a silicon carbide substrate, said wall flow substrate comprising an inlet end, and outlet end, a substrate axial length extending between the inlet end and the outlet end, and a plurality of passages defined by the internal walls of the wall flow substrate;
    wherein the plurality of passages comprise inlet passages having an open inlet end and a closed outlet end, and outlet passages having a closed inlet end and an open outlet end;
    wherein a given inlet passage, an adjacent outlet passage, and the internal wall between said inlet and said outlet passage define an overall passage;
  (ii) applying a first coating to at least part of the internal walls of at least 20% of the overall passages such that the first coating extends from the inlet end to a first coating end whereby a first coating length is defined, wherein the first coating length is x % of the substrate axial length, with $20 \leq x \leq 100$, thereby adjusting the loading of the first coating to a predetermined value which is preferably in the range of from 0.05 to 1 g/inch$^3$ (g/(2.54 cm)$^3$), said first coating comprising an oxidation catalyst comprising platinum (Pt) and optionally palladium (Pd) wherein the weight ratio of Pt:Pd in the first coating is in the range of from 1:0 to greater than 1:1;
  (iii) applying a second coating to at least part of the internal walls of said overall passages downstream of the first coating, said second coating having a second coating length of y % of the substrate axial length, with $20 \leq y \leq 100$, so that the first and the second coating overlap in length by at least 20% of the substrate axial length;
    thereby adjusting the loading of the second coating to a predetermined value which is preferably in the range of from 0.05 to 1 g/inch$^3$ (g/(2.54 cm)$^3$) such that the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)), said second coating comprising an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1.

24. The process of embodiment 23, wherein step (iii) is carried out before step (ii) and wherein the second coating is applied such that it extends from the open inlet end to a second coating end, thereby defining the second coating length of y % of the substrate axial length.

25. The process of embodiment 23, wherein step (iii) is carried out before, simultaneously with or after step (ii) and wherein the second coating is applied such that it extends from the open outlet end to a second coating end, thereby defining the second coating length of y % of the substrate axial length.

26. A system for treating a diesel engine exhaust stream, the system comprising an exhaust conduit in fluid communication with the diesel engine via an exhaust manifold;
  a catalyzed soot filter of any of embodiments 1 to 19; and
  one or more of the following in fluid communication with the catalyzed soot filter: a diesel oxidation catalyst (DOC), a selective catalytic reduction (SCR) article, a NOx storage and reduction (NSR) catalytic article.

27. The system of embodiment 26, wherein the catalyzed soot filter is arranged downstream of the DOC.

28. A method of treating a diesel engine exhaust stream, the exhaust stream containing soot particles, said method comprising contacting the exhaust stream with a catalyzed soot filter of any of embodiments 1 to 19, preferably after having directed the exhaust stream through a diesel oxidation catalyst (DOC), said DOC preferably comprising a flow through substrate or a wall flow substrate.

29. The method of embodiment 28, further comprising directing the exhaust stream resulting from the DOC or from the catalyzed soot filter through a selective catalytic reduction (SCR) article.

In the following, embodiments of the present invention is further illustrated by the following examples.

EXAMPLES

1. Catalyst Preparation 1.1 Zoned Catalysed Soot Filter without Coating Overlap—Comparative (Sample A)

For the first coating gamma-alumina (final dry content 0.15 g/in$^3$) was impregnated with a Platinum solution with Platinum as an ammine stabilized Pt complex to give a dry solids content of Pt of 25 g/ft$^3$ followed by an impregnation of an aqueous solution of Palladium nitrate giving a dry solids content of Pd of 5 g/ft$^3$. The resulting powder was dispersed in water, and H-Beta zeolite was added as dry powder resulting in a dry solids content of 0.15 g/in$^3$. Subsequently, the resulting slurry was used for coating the silicon carbide filter substrate (2.5 L volume) from the open inlet side to 50% of the total filter length. After drying at 110° C. in air and calcination at 450° C. in air the amount of washcoat on the 50% inlet of the filter substrate were approximately 0.37 g/in$^3$.

For the second coating 100% ceria (dry solids content 0.15 g/in$^3$) was impregnated with an aqueous solution of Palladium nitrate giving a dry solids content of Pd of 20 g/ft$^3$. The resulting powder was dispersed in water, and gamma-alumina was added as dry powder resulting in a dry solids content of 0.15 g/in$^3$. Subsequently, the resulting slurry was used for coating the silicon carbide filter substrate (2.5 L volume) from the open outlet side to 50% of the total filter length. After drying at 110° C. in air and calcination at 450° C. in air the amount of washcoat on the 50% outlet of the filter substrate were approximately 0.36 g/in$^3$.

1.2 Zoned Catalysed Soot Filter with Coating Overlap—50% of Length (Sample B)

For the first coating gamma-alumina (dry solids content 0.15 g/in$^3$) was impregnated with a Platinum solution with Platinum as an ammine stabilized Pt complex to give a dry solids content of Pt of 25 g/ft$^3$ followed by an impregnation of an aqueous solution of Palladium nitrate giving a dry solids content of Pd of 5 g/ft$^3$. The resulting powder was dispersed in water resulting in a dry solids content of 0.15 g/in$^3$. Subsequently, the resulting slurry was used for coating the silicon carbide filter substrate (2.5 L volume) from the open inlet side to 50% of the total filter length. After drying at 110° C. in air and calcination at 450° C. in air the amount of washcoat on the 50% inlet of the filter substrate were approximately 0.22 g/in$^3$.

For the second coating ceria-zirconia material (CeO$_2$: 45 wt %, ZrO$_2$: 43.5 wt %, La$_2$O$_3$: 8 wt %, Pr$_6$O$_{11}$: 2 wt %, HfO$_2$: 1.5 wt %, dry solids content 0.05 g/in$^3$) was impregnated with an aqueous solution of Palladium nitrate giving a dry solids content of Pd of 10 g/ft$^3$. The resulting powder was dispersed in water, and H-Beta zeolite and gamma-alumina were added as dry powder resulting in a dry solids content of 0.05 g/in$^3$. Subsequently, the resulting slurry was used for coating the silicon carbide filter substrate (2.5 L volume) from the open outlet side to 100% of the total filter length. After drying at 110° C. in air and calcination at 450° C. in air the amount of washcoat on the 100% outlet of the filter substrate were approximately 0.26 g/in$^3$.

1.3 Zoned Catalysed Soot Filter with Coating Overlap—100% of Length (Sample C)

For the first coating gamma-alumina (dry solids content 0.15 g/in$^3$) was impregnated with a Platinum solution with Platinum as an ammine stabilized Pt complex to give a dry solids content of Pt of 12.5 g/ft$^3$ followed by an impregnation of an aqueous solution of Palladium nitrate giving a dry solids content of Pd of 2.5 g/ft$^3$. The resulting powder was dispersed in water. Subsequently, the resulting slurry was used for coating the silicon carbide filter substrate (2.5 L volume) from the open inlet side to 100% of the total filter length. After drying at 110° C. air and calcination at 450° C. in air the amount of washcoat on the 100% inlet of the filter substrate were approximately 0.21 g/in$^3$.

For the second coating ceria-zirconia material (CeO$_2$: 45 wt %, ZrO$_2$: 43.5 wt %, La$_2$O$_3$: 8 wt %, Pr$_6$O$_{11}$: 2 wt %, HfO$_2$: 1.5 wt %, dry solids content 0.05 g/in$^3$) was impregnated with an aqueous solution of Palladium nitrate giving a dry solids content of Pd of 10 g/ft$^3$. The resulting powder was dispersed in water, and H-Beta zeolite and gamma-alumina were added as dry powder resulting in a dry solids content of 0.05 g/in$^3$. Subsequently, the resulting slurry was used for coating the silicon carbide filter substrate (2.5 L volume) from the open outlet side to 100% of the total filter length. After drying at 110° C. air and calcination at 450° C. in air the amount of washcoat on the 100% outlet of the filter substrate were approximately 0.26 g/in$^3$.

2. Comparison to State of the Art Catalyst Technologies with Invention Technology (Light-off Test)

Test Samples:

2.1 Sample A (Comparative):
Zoned catalysed soot filter without coating overlap:
Inlet coat: 25 g/ft$^3$ Pt, 5 g/ft$^3$ Pd—50% of length
Outlet coat: 20 g/ft$^3$ Pd—50% of length 2.2 Sample B:
Zoned catalysed soot filter with coating overlap—50% of length:
Inlet coat: 25 g/ft$^3$ Pt, 5 g/ft$^3$ Pd—50% of length
Outlet coat: 10 g/ft$^3$ Pd—100% of length 2.3 Sample C:
Zoned catalysed soot filter with coating overlap—100% of length:
Inlet coat: 25 g/ft$^3$ Pt, 2.5 g/ft$^3$ Pd—100% of length
Outlet coat: 10 g/ft$^3$ Pd—100% of length 3. Test Procedure NO$_2$/Nox Light-Off Testing Samples A, B, and C were tested for NO$_2$ light-off performance. Prior to testing the samples were hydrothermally aged in an oven at 750° C. for 5 h in air with 10% of water. For light-off testing each sample was placed upstream behind a state of the art Pt/Pd=1/1 DOC with 120 g/ft$^3$ loading and 1.2 L catalyst volume downstream in the exhaust line a 4 cylinder light duty common rail diesel engine with 2 L engine displacement. The CO, HC, NOx and NO concentration in the exhaust stream was 600 ppm, 60 ppm (C3 basis), 100 ppm and 50 ppm, respectively. The gas flow under standard conditions was around 45 m$^3$/h. The temperature ramp was 5 K/min. The NO$_2$/NOx ratio at 300° C. pre CSF temperature was used for evaluation. A lower NO$_2$/NOx ratio at 300° C. relates to a lower NO$_2$ formation during driving.

Figure 1:
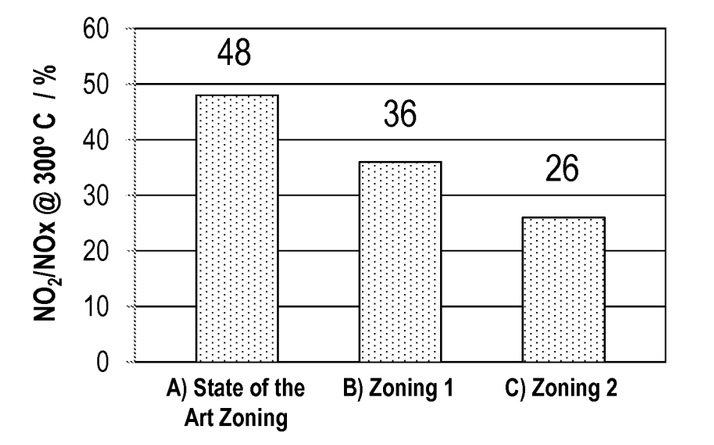
FIG. 1 shows the NO$_2$/NOx ratios as obtained from the treatment of diesel exhaust using the catalysed soot filters according to Samples (A), (B) and (C) of the inventive examples.

The NO$_2$/NOx ratio at 300° C. during light-off Samples (A) to (C) is shown in FIG. 1.

Samples B and C showed lower maximum NO$_2$/NOx ratio compared to Sample A and therefore a lower NO$_2$ tail pipe emission during driving. The lowest NO$_2$/NOx ratio is observed for Sample C with the 100% overlap of the first and second coat.

The invention claimed is:

1. A catalyzed soot filter, comprising
a wall flow substrate comprising an inlet end, an outlet end, a substrate axial length extending between the inlet end and the outlet end, and a plurality of passages defined by internal walls of the wall flow filter substrate;
wherein the plurality of passages comprise inlet passages having an open inlet end and a closed outlet end, and outlet passages having a closed inlet end and an open outlet end;
wherein a given inlet passage, an adjacent outlet passage, and the internal wall between said inlet and said outlet passage define an overall passage;
wherein the internal walls of at least 20% of the overall passages are at least partially coated with a first and a second coating;
wherein the internal wall of a given at least partially coated overall passage comprises the first coating that extends from the open inlet end to a first coating end, thereby defining a first coating length, wherein the first coating length is x % of the substrate axial length, with $20 \leq x \leq 100$;
wherein said internal wall of said overall passage further comprises the second coating located downstream of the first coating, said second coating having a second coating length of y % of the substrate axial length, with $20 \leq y \leq 100$;

wherein the first and the second coating overlap in length by at least 20% of the substrate axial length;

wherein the first coating comprises an oxidation catalyst comprising platinum (Pt) and optionally palladium (Pd) and wherein the weight ratio of Pt:Pd in the first coating is in the range of from 1:0 to greater than 1:1;

wherein the second coating comprises an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1;

wherein the first coating and the second coating are present on the wall flow substrate at a coating loading ratio in the range of from 0.25 to 3, calculated as ratio of the loading of the first coating (in g/inch$^3$ (g/(2.54 cm)$^3$)): loading of the second coating (in g/inch$^3$ (g/(2.54 cm)$^3$)).

2. The catalyzed soot filter according to claim 1, wherein the second coating extends from the open inlet end to a second coating end, thereby defining the second coating length of y % of the substrate axial length.

3. The catalyzed soot filter according to claim 1, wherein the second coating extends from the open outlet end to a second coating end, thereby defining the second coating length of y % of the substrate axial length.

4. The catalyzed soot filter of claim 1, wherein x is in the range of from 20 to 80.

5. The catalyzed soot filter of claim 1, wherein the coating loading ratio is in the range of from 0.75 to 1.25.

6. The catalyzed soot filter of claim 1, wherein the loading of the first coating is in the range of from 0.05 to 1, and wherein the loading of the second coating is in the range of from 0.05 to 1.

7. The catalyzed soot filter of claim 1, wherein in the first coating, the weight ratio of Pt:Pd is in the range of from 1:0 to 2:1.

8. The catalyzed soot filter of claim 1, wherein in the first coating, the weight ratio of Pt:Pd is 1:0.

9. The catalyzed soot filter of claim 1, wherein in the second coating, the weight ratio of Pt:Pd is in the range of from 1:2 to 0:1.

10. The catalyzed soot filter of claim 1, wherein the weight ratio of the sum of the weights of Pt and optionally Pd in the first coating to the sum of the weights of Pd and optionally Pt in the second coating is in the range of from 1:6 to 10:1.

11. The catalyzed soot filter of claim 10, wherein the weight ratio of the sum of the weights of Pt and optionally Pd in the first coating to the sum of the weights of Pd and optionally Pt in the second coating is in the range of from 1:6 to 2:1.

12. The catalyzed soot filter of claim 11, wherein in the first coating, the weight ratio of Pt:Pd is 1:0 and the concentration of Pt is in the range of from 0.5 to 1 g/ft$^3$ (g/(30.48 cm)$^3$), and wherein in the second coating, the weight ratio of Pt:Pd is 0:1 and the concentration of Pd is in the range of from 0.5 to 3 g/ft$^3$ (g/(30.48 cm)$^3$).

13. The catalyzed soot filter of claim 10, wherein the weight ratio of the sum of the weights of Pt and optionally Pd in the first coating to the sum of the weights of Pd and optionally Pt in the second coating is in the range of from 2.4:1 to 10:1.

14. The catalyzed soot filter of claim 13, wherein in the first coating, the weight ratio of Pt:Pd is in the range of from 1:0 to 1:1, and the concentration of Pt is in the range of from 5 to 100 g/ft$^3$ (g/(30.48 cm)$^3$), and wherein in the second coating, the weight ratio of Pt:Pd is in the range of from 0:1 to 1:1, and the concentration of Pd is in the range of from 1 to 30 g/ft$^3$ (g/(30.48 cm)$^3$).

15. The catalyzed soot filter of claim 1, wherein the oxidation catalyst comprised in the first coating consists of Pt and optionally Pd and the oxidation catalyst comprised in the second coating consists of Pd.

16. The catalyzed soot filter of claim 1, wherein the first coating and the second coating comprise at least one porous support material for the respective platinum group metal(s), wherein the at least one porous support material of the first coating comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %, and wherein the at least one porous support material of the second coating comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %.

17. The catalyzed soot filter of claim 16, wherein the support material of the first coating comprises $Al_2O_3$ and wherein the support material of the second coating comprises $Al_2O_3$.

18. The catalyzed soot filter of claim 1, wherein the wall flow substrate has a porosity in the range of from 38 to 75, determined according to mercury porosity measurement according to DIN 66133.

19. The catalyzed soot filter of claim 1, comprised in a system for treating a diesel engine exhaust stream, the system further comprising an exhaust conduit in fluid communication with the diesel engine via an exhaust manifold, and further comprising one or more of the following in fluid communication with the catalyzed soot filter: a diesel oxidation catalyst (DOC), a selective catalytic reduction (SCR) article, an NOx storage and reduction (NSR) catalytic article.

20. The catalyzed soot filter of claim 19, arranged downstream of the DOC.

21. The catalyzed soot filter of claim 1 for use in a method of treating a diesel engine exhaust stream, the exhaust stream containing soot particles, said method comprising contacting the exhaust stream with the catalyzed soot filter.

22. A process for manufacturing a catalyzed soot filter of claim 1, comprising the steps of
(i) providing a wall flow substrate, said wall flow substrate comprising an inlet end, and outlet end, a substrate axial length extending between the inlet end and the outlet end, and a plurality of passages defined by the internal walls of the wall flow substrate;
wherein the plurality of passages comprise inlet passages having an open inlet end and a closed outlet end, and outlet passages having a closed inlet end and an open outlet end;
wherein a given inlet passage, an adjacent outlet passage, and the internal wall between said inlet and said outlet passage define an overall passage;
(ii) applying a first coating to at least part of the internal walls of at least 20% of the overall passages such that the first coating extends from the inlet end to a first coating end whereby a first coating length is defined, wherein the first coating length is x % of the substrate axial length, with $20 \leq x \leq 100$, thereby adjusting the loading of the first coating to a predetermined value, said first coating comprising an oxidation catalyst comprising platinum (Pt) and optionally palladium (Pd) wherein the weight ratio of Pt:Pd in the first coating is in the range of from 1:0 to greater than 1:1;
(iii) applying a second coating to at least part of the internal walls of said overall passages downstream of the first coating, said second coating having a second coating length of y % of the substrate axial length, with $20 \leq y \leq 100$, so that the first and the second coating overlap in length by at least 20% of the substrate axial length;

thereby adjusting the loading of the second coating to a predetermined value such that the first coating and the second coating are present on the wall flow substrate at a coating loading ratio in the range of from 0.25 to 3, calculated as ratio of the loading of the first coating (in g/inch$^3$ (g/(2.54 cm)$^3$)) : loading of the second coating (in g/inch$^3$ (g/(2.54 cm)$^3$)), said second coating comprising an oxidation catalyst comprising Pd and optionally Pt, wherein the Pt concentration in the second coating is lower than the Pt concentration in the first coating and wherein the weight ratio of Pt:Pd in the second coating is in the range of from 1:1 to 0:1.

23. The process of claim 22, wherein step (iii) is carried out before step (ii) and wherein the second coating is applied such that it extends from the open inlet end to a second coating end, thereby defining the second coating length of y % of the substrate axial length.

24. The process of claim 22, wherein step (iii) is carried out before, simultaneously with or after step (ii) and wherein the second coating is applied such that it extends from the open outlet end to a second coating end, thereby defining the second coating length of y % of the substrate axial length.

25. A system for treating a diesel engine exhaust stream, the system comprising an exhaust conduit in fluid communication with the diesel engine via an exhaust manifold;
   a catalyzed soot filter of claim 1; and
   one or more of the following in fluid communication with the catalyzed soot filter: a diesel oxidation catalyst (DOC), a selective catalytic reduction (SCR) article, a NOx storage and reduction (NSR) catalytic article.

26. The system of claim 25, wherein the catalyzed soot filter is arranged downstream of the DOC.

27. A method of treating a diesel engine exhaust stream, the exhaust stream containing soot particles, said method comprising contacting the exhaust stream with a catalyzed soot filter of claim 1.

28. The method of claim 27, further comprising directing the exhaust stream resulting from the DOC or from the catalyzed soot filter through a selective catalytic reduction (SCR) article.

29. The catalyzed soot filter of claim 1, wherein in the second coating, the weight ratio of Pt:Pd is in the range of from 0:1.

* * * * *